Aug. 4, 1959  J. H. COWLES ET AL  2,897,581
METHOD OF MAKING ROLLER BEARINGS
Filed Aug. 26, 1955  2 Sheets-Sheet 1

INVENTORS
JOHN H. COWLES
ROBERT H. WHITE
SIDNEY F. CLARK

BY Mason, Porter, Diller & Stewart
ATTORNEYS

Aug. 4, 1959     J. H. COWLES ET AL     2,897,581
METHOD OF MAKING ROLLER BEARINGS
Filed Aug. 26, 1955     2 Sheets-Sheet 2

INVENTORS
JOHN H. COWLES
ROBERT H. WHITE
SIDNEY F. CLARK

ATTORNEYS

2,897,581

METHOD OF MAKING ROLLER BEARINGS

John H. Cowles, Forestville, and Robert H. White and Sidney F. Clark, Torrington, Conn., assignors to The Torrington Company, Torrington, Conn., a corporation of Maine Application August 26, 1955, Serial No. 530,708

2 Claims. (Cl. 29—148.4)

The following specification relates to a novel method of making roller bearings.

The particular bearing may be defined as a self-contained one in which there is an outer race, a series of bearing rollers resting in parallel relationship within the outer race, and spaced apart by a cage or grid, the ends of which are opposite the end flanges of the race. The grid also has a series of parallel bars which in the final form rest between adjacent rollers and hold them in parallelism with the axis of the race.

One object of this invention is to provide for inserting a cage or grid axially of the race for the purpose of spacing the rollers in the desired positions.

The particular roller bearing is formed by a novel method in which the parts are assembled in the final relationship, but the grid is in a preliminary form in which it may be inserted and finally expanded into its final or permanent form.

The above and other objects of the invention will be clearly apparent from the following description of the preferred form of the roller bearing, and the novel method of assembly, as illustrated by way of example in the following drawings in which Fig. 1 is a vertical longitudinal section of completed bearing taken on line 1—1 of Fig. 2;

The principal object of the invention is to assemble the race and the rollers in final position but to provide a novel cage or grid which can be inserted in final position and then expanded into the final or locking form. This is accomplished by giving the grid first a slightly conical form. Thus the leading end will be of a diameter small enough to clear the inner diameter of the series of rollers. In this movement, the larger end of the conical grid is brought opposite the flange of the race. At the same time each roller is constrained to take a position between adjacent bars of the grid. The leading end of the grid is then opposite the second flange of the race.

Figure 3:
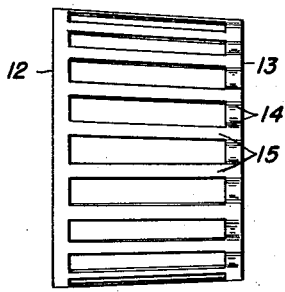
Fig. 3 is a side elevation of the bearing cage during manufacture.

This clearance of the end is effected by giving the leading end of the grid a reduced diameter in a preliminary step. This can be done either by fluting or corrugating the leading edge as in Fig. 3 or by forming the cage in a normally conical shape as in Fig. 7.

By expanding the leading end of the grid, it is given the same diameter as the following end, that is, loosely fitting within the flanges of the race.

Expanding the leading end of the grid is accomplished by pressure from a forming tool which is conical in shape and bears outwardly against the leading end through intermediate split rings, or a similar expandable element.

As shown on the drawings, the outer race 8 is made with inwardly curved end flanges 9, 9. A retaining cage or grid 10 fits loosely with the flanges 9, 9.

A series of rollers 11 is provided to occupy practically the entire space between the flanges 9, 9, projecting inwardly from the race. The rollers 11 must be maintained parallel to the axis of the race 8, and this is accomplished by provision of the retaining cage or grid.

Figure 1:
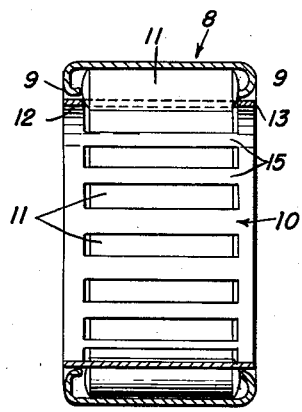
Figure 2:
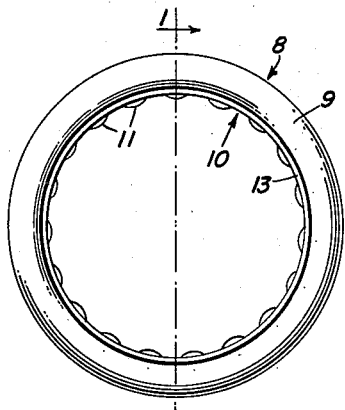
Fig. 2 is a front elevation of the same.

The grid has one end 12 of normal diameter as shown in Fig. 1, and this is the following end during assembly.

The opposite or leading end 13 of the grid in the final form will also have the same diameter. However, during preliminary preparation, the end 13 is given a reduced diameter as by a series of internal flutes 14, 14. Bars 15 extend between the ends 12 and 13 and are located between the flutes 14 of the end 13. The number of flutes need not be the same as the bars but only enough to provide adequate reduction in diameter to pass the row of rollers.

The grid 10 is made of sheet metal, either by rolling up and welding together the ends of a slotted strip of pliable metal, or the grid may be formed from an initial tubular stock. This stock may be slotted to form the bars 15.

Figure 4:
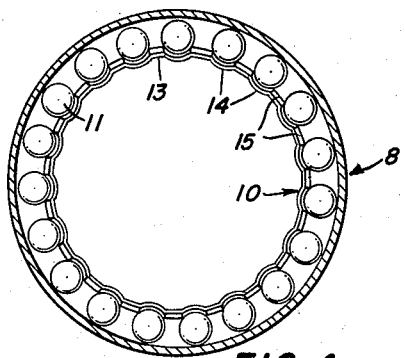
Fig. 4 is a transverse vertical cross-section of the assembled cage, rollers and outer race before finally expanding the cage.

The important feature is that, by reason of the flutes 14, 14, the leading end 13 is given an outside diameter which is less than the inner diameter of the series of rollers. This is plainly indicated on Fig. 4.

With the requisite number of rollers 11 placed within the race 8, the leading end 13 when inserted axially will pass the rollers and easily cause them to take up a spaced arrangement opposite the flutes 14, 14. As the grid is inserted, the bars 15 fit between adjacent rollers and hold the latter in spaced parallelism.

Figure 7:
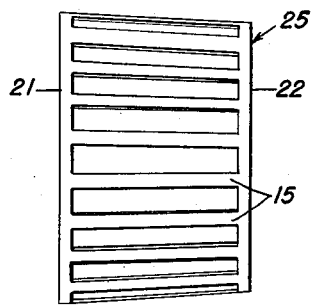
Fig. 7 is a side elevation of a modified form of bearing cage as initially formed.
Figure 8:
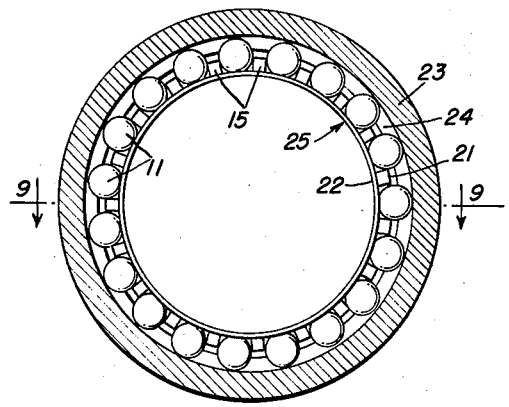
Fig. 8 is a front elevation partly in section of this modified form prior to final expansion of the cage assembled with the rollers and outer race.
Figure 9:
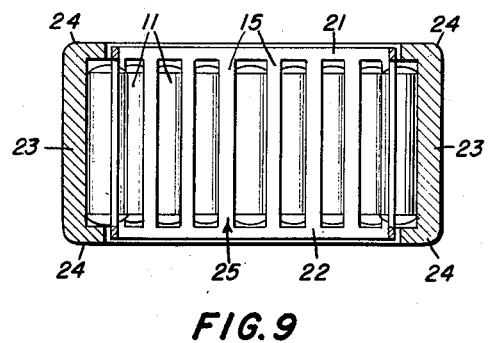
Fig. 9 is a transverse section taken on line 9—9 of Fig. 8, of the completed assembly with the cage expanded.

A modified form of the cage or grid is shown in Figs. 7, 8 and 9. Here the cage or grid 25 is made initially in the form of a cone. The larger end 21 has a diameter slightly less than the inner flange diameter of the corresponding outer bearing or raceway. The smaller end 22 of the grid 25 has a reduced diameter less than the inside diameter of the row of rollers as held in the outer raceway.

The outer raceway in this instance is shown as heavier sectioned metal race made by casting or machine turning.

Inner flanges 24, 24 of the raceway 23 serve to confine the rollers 11 from axial movement.

The leading narrow end 22 of the conical grid 25 is proportioned to slide past the rollers 11 in the manner shown in Fig. 8. Thus the rollers are held in place primarily by the outwardly flaring ends of the bars 15.

To accomplish the permanent fastening of the rollers in position, the assembled race, rollers and grid are set vertically upon a flat anvil 16.

Figure 5:
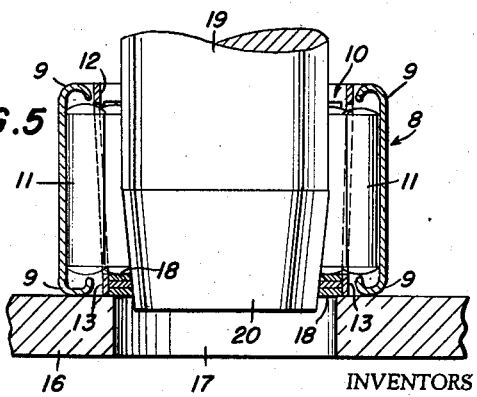
Fig. 5 is a vertical section of the parts arranged for expansion of the cage.

The anvil has a circular passageway 17 slightly less in diameter than the smaller end 13 or 22 of the grid. Thus the grid rests upon the anvil and is surrounded by one end of the outer race. The series of split rings 18 is provided of an appropriate size to rest upon anvil 16 within the leading end 13 of the grid. This position is shown in Fig. 5 of the drawings. The split rings 13 may be two or more. When thus used, the opening of the rings are most unlikely to coincide. It follows that the rings may then be spread equally in all radial directions.

Figure 6:
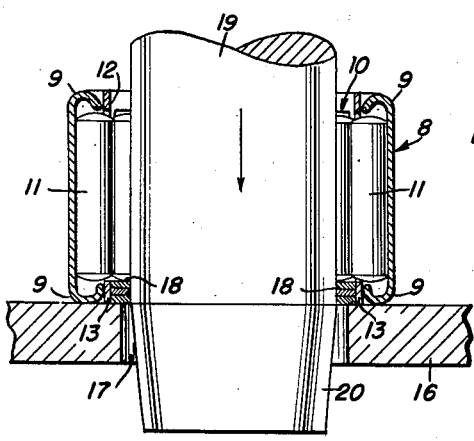
Fig. 6 is a corresponding section at the conclusion of the assembling operation.

To accomplish this spreading movement, we provide a plunger 19. This plunger has a lower tapered shoulder 20. The shoulder has a diameter which will fit within the split rings in their normal retracted position. By driving the plunger 19 downwardly, the tapered shoulder forces the split rings outwardly into the positions shown in Fig. 6.

The split rings in this operation smooth out the flutes in the leading end 13 of the grid so that this end is restored to its normal diameter equal to that of the trailing or following end 12.

Only enough flutes need be provided to cause adequate reduction in diameter of the smaller end. Thus flutes may not be located between every pair of bars.

In the use of the modified form 25, the ductility of the metal is such that the smaller end 22 is stretched to the same diameter as the larger end 21.

Withdrawal of the plunger 19 disengages the split rings from the grid so that the assembled bearing may now be removed.

Other expandable elements such as elastic rubber rings may be used in place of the split rings.

The grid being made of pliable sheet metal will retain the final cylindrical form thus serving as a keeper for the rollers and being in turn prevented by the latter from disengagement from the outer race.

While we have shown the preferred form of the invention and the selected method of assembling the novel bearing, numerous changes in material, proportions and manipulation are possible within the scope of the invention as defined in the following claims.

What we claim is:

1. The method of assembling a cylindrical needle bearing which comprises inserting a series of needle rollers loosely within an outer cylindrical race having spaced inwardly turned end flanges, sliding a slightly conical continuous sheet metal grid axially within the race with the bars of the grid separating the needle rollers, said grid having a fluted leading end band of less diameter than the inner diameter of the series of rollers and a following end band fitting loosely within the opposite flange of the outer race, and expanding the leading end band to the same loose fit within the corresponding end flange with the bars of the grid parallel.

2. The method of assembling a cylindrical needle bearing which comprises inserting a series of needle rollers loosely in parallel relationship within a cylindrical outer bearing between inturned end flanges, fluting one end of a cylindrical grid to form a cone, sliding the fluted end of the grid past the rollers with the grid bars separating the needle rollers, and expanding the fluted end into a loose fit opposite the corresponding race flange.

References Cited in the file of this patent

UNITED STATES PATENTS

| 1,982,899 | Buckwalter | Dec. 4, 1934 |
| 2,644,730 | Levine | July 7, 1953 |

FOREIGN PATENTS

| 139,434 | Australia | Nov. 15, 1950 |
| 708,447 | Great Britain | May 5, 1954 |